United States Patent [19]

Bekele

[11] Patent Number: 4,927,691
[45] Date of Patent: May 22, 1990

[54] IMPLOSION RESISTANT FILMS

[75] Inventor: Solomon Bekele, Taylors, S.C.

[73] Assignee: W. R. Grace & Co.-Conn., Duncan, S.C.

[21] Appl. No.: 109,543

[22] Filed: Oct. 16, 1987

[51] Int. Cl.$^5$ ............................................. B32B 27/08
[52] U.S. Cl. .................................. 428/35.2; 428/332;
428/349; 428/516; 428/520; 428/910;
264/176.1
[58] Field of Search .................. 428/910, 35.2, 516,
428/520, 332, 349

[56] References Cited

U.S. PATENT DOCUMENTS 4,469,742 9/1984 Oberle et al. .................... 428/215
4,801,486 1/1989 Quacquarella et al. ............ 428/520

FOREIGN PATENT DOCUMENTS 86105199.3 11/1987 European Pat. Off. .
1271995 4/1972 United Kingdom .
1522397 8/1978 United Kingdom .

Primary Examiner—P. C. Ives
Attorney, Agent, or Firm—John J. Toney; William D. Lee, Jr.; Mark B. Quatt

[57] ABSTRACT

A multilayer film useful in vacuum skin packaging and other vacuum packaging applications, having improved implosion resistance and resistance to bridging, includes core and intermediate layers of EVA, layers of polymer between the EVA layers, and abuse and sealant layers. A barrier version includes a core layer of oxygen barrier polymeric material.

8 Claims, 2 Drawing Sheets

IMPLOSION RESISTANT FILMS

BACKGROUND OF THE INVENTION

The present invention relates to packaging films, and more specifically to packaging films useful in vacuum packaging applications.

Vacuum packaging, and particularly vacuum skin packaging has become an increasingly attractive way of packaging fresh red meats. The final package presents a tight fitting, clear package which protects the food article from the external environment. However, the demands imposed on the packaging material used in vacuum packaging, and especially in vacuum skin packaging, are high.

One particular problem which has presented a significant hurdle for the development of vacuum skin packaging has been implosion or breakage of the film during the packaging of fresh pork, broiled and browned pork, shingled turkey breast, and other food items. Generally, products that have cavities or undercuts are especially prone to implosions or leakers created by failure of the film during the vacuum skin packaging process. Using standard materials, package failures as high as 60% have occurred.

Thus, in actual practice, conventional films tend to be broken when subjected to the high stretch ratios at particular projections, undercuts or recesses present on the material being packaged.

To resolve this problem, it is an object of the present invention to provide a highly formable film which is nevertheless resistant to im-plosions created during the vacuum skin packaging process, and provides high abuse protection for the final packaged product.

Of interest is U.S. Pat. No. 4,469,742 issued to Oberle disclosing a multilayer film having the structure (inner) A/B/C/D/C/E (outer), where A is a bonding layer comprising an ethylene-propylene copolymer; B is a shrinking layer which may be formed from an ethylene vinyl acetate copolymer having a vinyl acetate content in the range of 6% to 12% by weight, preferably 6%; C are adhesive layers affected to join the barrier layer D to the remainder of the film. The layer D is formed from ethylene vinyl alcohol copolymer. The outer layer E isolates the barrier layer against contact with outside moisture and comprises an ethylene vinyl acetate copolymer having a vinyl acetate content ranging from 5% to 12%, preferably 6%, by weight.

UK Patent No. 1,271,995 (Gerow) discloses laminated oxygen barrier films including a formable base layer, hydrolyzed ethylene vinyl acetate, and a heat sealable layer such as EVA.

An object of the present invention is to provide a film which provides an oxygen barrier property for the preservation of food product such as meats adversely affected by oxidation.

Another object of the present invention is to control and limit the bridging phenomenon which can occur between adjacent forming stations in a VSP machine.

Yet another aspect of the present invention is to provide a film resistant to rupture induced in some thermoforming and VSP applications.

Still another object of the present invention is to provide a rupture-resistant film while possesses good optical properties.

SUMMARY OF THE INVENTION

In one aspect of the present invention, an implosion resistant film comprises a core layer of ethylene vinyl acetate copolymer; two intermediate layers each comprising ethylene vinyl acetate copolymer; two polymeric layers which each bond an intermediate layer to a respective surface of the core layer; a first outer layer, bonded to one of the intermediate layers, comprising a heat sealable polymeric material; and a second outer layer, bonded to one of the intermediate layers, comprising a high density polyethylene.

In another aspect of the present invention, an implosion resistant film having oxygen barrier properties comprises a core layer of ethylene vinyl alcohol copolymer; two intermediate layers each comprising ethylene vinyl acetate copolymer; two polymeric adhesive layers which each bond an intermediate layer to a respective surface of the core layer; a first outer layer, bonded to one of said intermediate layers, comprising a heat sealable polymeric material; and a second outer layer, bonded to one of said intermediate layers, comprising a high density polyethylene.

BRIEF DESCRIPTION OF THE DRAWINGS

Further details are given below in reference to the drawings wherein.

DESCRIPTION OF PREFERRED EMBODIMENTS

Figure 1:
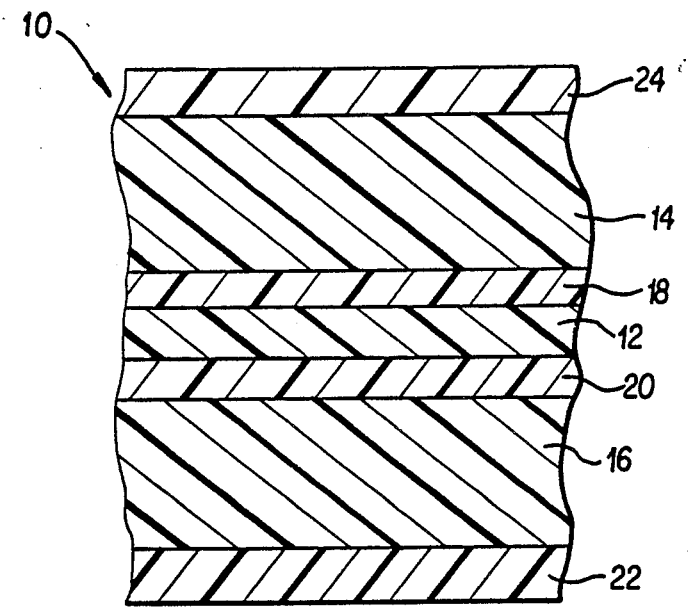
FIG. 1 is a schematic cross section of the preferred embodiment of a multi-layer film of the invention.

Referring to FIG. 1 a seven layer film 10 is designed primarily for vacuum packaging and especially for vacuum skin packaging. The core layer 12 of the this film, as well as intermediate layers 14 and 16 comprises ethylene vinyl acetate copolymer (EVA).

Preferable EVA resins are those with relatively high vinyl acetate content, more preferably between about 15 and 20% vinyl acetate by weight, and most preferably about 18% vinyl acetate by weight of the copolymer.

A suitable resin for layers 12 and 14 is Elvax 3165 available from du Pont Chemicals, with a melt index of 0.7 decigrams per minute (ASTM D1238).

A suitable resin for layer 16 is Norchem NPE 3311, having a vinyl acetate content of 19% by weight, and a melt index of between about 2.5 and 3.5 decigrams per minute (ASTM D1238).

Layers 18 and 20, located between core layer 12 and the respective intermediate EVA layers 14 and 16, comprise a polymer and preferably a polyolefin and more preferably low density polyethylene. One example of a suitable resin for layer 18 and 20 is Chemplex 3404, a low density polyethylene, available from Norchem.

Layer 22 comprises an abuse resistant material and preferably high density polyethylene. Alathon 5777 (du Pont) is a preferred resin for use in layer 22. More preferable is a high density polyethylene with narrow molecular weight distribution, such as XF-337K (Soltex).

Layer 24, useful as a sealant layer when sealing the multilayer film to itself or to another film or laminate, preferably comprises a heat sealable polymeric material and more preferably an ionomer or ethylene alpha-olefin copolymer. A preferred ionomer resin is Surly 1605 (du Pont) a 2.8 melt index, sodium-based ionomer available from du Pont. Another preferred material is Dowlex 4002, a linear ethylene-alpha olefin copolymer having a density of about 0.912 gms/cc and available from Dow Chemical Company.

In an alternate embodiment of the present invention, a multi-layer film is provided which includes an oxygen barrier material in the core layer 12 to provide increased shelf life in applications where the packaged product is sensitive to and deteriorates from the presence of oxygen in the interior environment of the package. Such applications are especially useful in packaging fresh red meats and other meat products and cheeses. In this alternate embodiment, core layer 12 comprises an oxygen barrier material and preferably ethylene vinyl alcohol copolymer.

The other materials of the oxygen barrier version are substantially the same as those in the primary embodiment, except that tie layers on either side of the core layer 12 i.e. layers 18 and 20 preferably comprise adhesive polymeric materials such as modified EVA, LDPE, HDPE or other suitable chemically modified polymeric adhesive layers and more preferably modified HDPE for better moisture protection of the EVOH layer, extending the shelf life of the packaged meat.

An especially preferred material for layers 18 and 20 is Plexar 201, a graft copolymer of HDPE and carboxylic acid or acid anhydride blended with a polyolefin, and available from Norchem.

The ionomer of sealant layer 24 is preferably sodium based, such as Surlyn 1605 available from DuPont, having a melt index of about 2.8. Preferred melt indices for the ionomer layer are between about 0.5 and 3.0. Another preferred material is Dowlex 4002, a linear ethylene-alpha olefin copolymer having a density of about 0.912 gms/cc and available from Dow Chemical Company.

A successful film for use in vacuum packaging, and in particular vacuum skin packaging, must resolve two significant problems in this application. The first is the problem of implosion or breakouts of film during the packaging operation. The second significant problem is bridging between separate forming units in the same packaging operation.

It has unexpectedly been found that by keeping the ethylene vinyl acetate copolymer content of the total film (excluding EVA content in tie or adhesive layers) between about 63% and 67% by weight, the incidence of both implosions and bridging between units are reduced. The higher limit of about 67% is particularly applicable for the primary embodiment described above, while the lower limit of about 63% applies primarily to the oxygen barrier embodiment. It is believed that below about 63% EVA by weight of the total multilayer structure, more implosions result, and that above about 67% by weight, undesirable film bridging between units will increase.

It has also unexpectedly been found that utilizing an EVA with a melt index of between about 2.5 and 3.5 decigrams per minute (ASTM D1238) next to the inside i.e. high density polyethylene layer results in reduced stretchiness and therefore reduced bridging between package units. Thus, the EVA of layer 16 preferably has a melt index between about 2.5 and 3.5 decigrams per minute.

Although the abuse layer 22 is designed for the exterior of the final package, it is preferred that the film be coextruded with layer 22 as an inside layer. For processability, melt indices of between about 5 and 8 are preferred for layer 22.

Alternatively, layer 22 can be used as a food contact layer, and the normally sealant layer 24, with the relatively high gloss associated with an ionomer or ethylene alpha-olefins, may be used as an outside layer.

Each example of the present invention was produced by coextrusion of the various layers to make a multi-layer film.

The coextruded tape reslting from the coextrusion of the individual layers is irradiated preferably to between about 12 and 18 megarads dosage and most preferably to between about 14 to 16 megarads dosage. It has been found that lower dosage levels, for example around 12 megarads are less desirable in applications where relatively wide dome sizes in vacuum skin packaging equipment are used. In this case, increased wrinkles at the edge of the film can result in the increased incidence of leakers.

It is believed that higher cross linking levels (ASTM D2765) add some elasticity or similar property to reduce leakers.

To some extent, chemical cross linking agents may be utilized in addition to or in lieu of irradiation of the coextruded tape.

Figure 2:
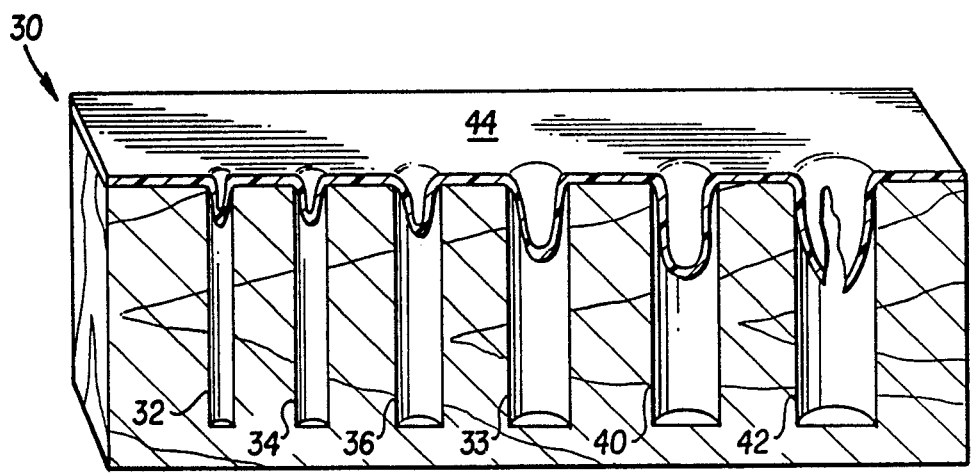
FIG. 2 is a schematic cross section of a testing device used for ascertaining the implosion resistance of packaging material.

FIG. 2 depicts a wooden block 30, drilled and vacuum skin packaged on a Cryovac® VS-44 machine. The film 10 completely enveloped the block 30, including the openings of bores 32, 34, 36, 38, 40 and 42. These openings are circular holes defined by the intersection of each cylindrical bore with the planar face 44 of wooden block 30.

Each bore was cylindrical, as shown, and drilled to the same depth of one inch. The diameters of the bores differed, ranging from 5/16 inches for the smallest hole to 1 inch for the largest hole.

During packaging tests with the wooden block 30, the film 10 tended to undergo a stretching stress which was higher the larger the area of a hole. In the Example considered in FIG. 2, the film 10 stretches without breaking over the holes 32, 34, 36, 38, and 40, but breaks in 42, over the largest area hole. The area of the largest hole before the film becomes broken is entered, therefore, in the last column of Table 1, and is highly representative of the film packaging ability.

The packaging tests on the block 30 were conducted throughout examples 1-29 on a Cryovac VS44 machine equipped with a rotary vacuum pump and a serially connected auxilary pump. The temperature under the heater bell was 200° C., and the films were infrared preheated up to 70°-80° C. The level of the vacuum provided varied between 3 and 6 millibars.

Figure 3:
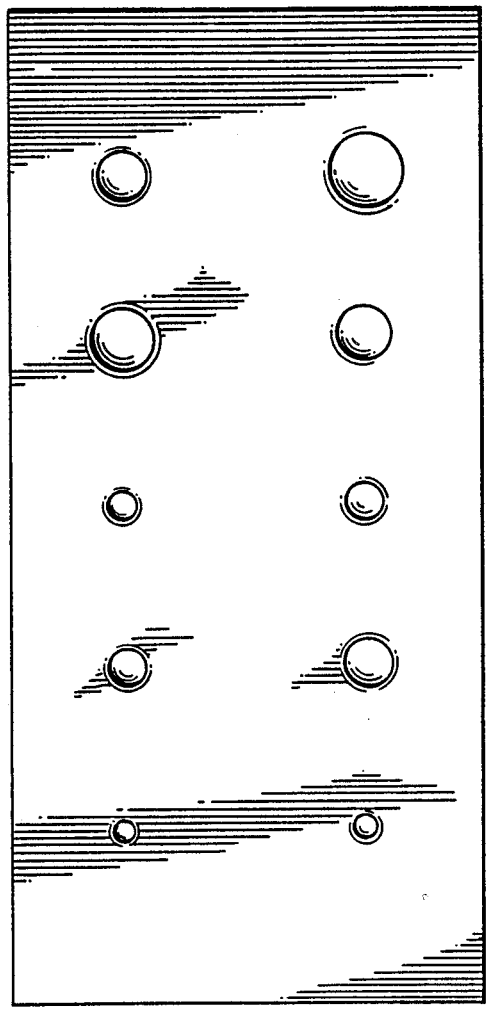
FIG. 3 is a plan view of a testing device similar to that of FIG. 2.

The resins making up the films tested as described and depicted in FIGS. 2 and 3, are identified below:

| | | |
|---|---|---|
| $EVA_1$ | = ELVAX 3165 | (DU PONT) |
| $EVA_2$ | = NORCHEM NPE 3311 | (ENRON) |
| $LDPE_1$ | = CHEMPLEX 3404 | (CHEMPLEX) |
| $LDPE_2$ | = LACQTENE 1070 | (ATOCHEM) |
| $ADHESIVE_1$ | = PLEXAR 3 | (CHEMPLEX) |
| $ADHESIVE_2$ | = PLEXAR 201 | (CHEMPLEX) |
| $ADHESIVE_3$ | = PLEXAR 169 | (CHEMPLEX) |
| $ADHESIVE_4$ | = BYNEL E 203 | (DU PONT) |
| $EVOH_1$ | = EVAL EC-F101 | (EVALCA) |
| $EVOH_2$ | = SOARNAL DT | (NIPPON GOHSEI) |

-continued

| | | |
|---|---|---|
| EVOH$_3$ | = SOARNAL STS | (NIPPON GOHSEI) |
| EVOH$_4$ | = EVAL EP L101 | (EVALCA) |
| EVOH$_5$ | = SOARNAL ET | (NIPPON GOHSEI) |
| EVOH$_6$ | = EVAL H 201 | (EVALCA) |
| IONOMER$_1$ | = SURLYN F1605 | (DU PONT) |
| IONOMER$_2$ | = SURLYN 1702 | (DU PONT) |
| IONOMER$_3$ | = SURLYN A-1650 | (DU PONT) |
| HDPE$_1$ | = ALATHON 5777 | (DU PONT) |
| HDPE$_2$ | = XF-337K | (SOLTEX) |

-continued

| | | |
|---|---|---|
| HDPE$_3$ | = LACQTENE HD 2090 | (ATOCHEM) |
| HDPE$_4$ | = LACQTENE HD 2035 | (ATOCHEM) |
| EAO$_1$ | = DOWLEX 4002 | (DOW) |
| EAO$_2$ | = DOWLEX 2035 | (DOW) |
| PP$_1$ | = NORCHEM NPP 2085 GW | (ENRON) |
| NYLON$_1$ | = ALLIED XPN 1586 | (ALLIED) |

The following films were produced by coextrusion of various combinations of the individual resins through a coextrusion die:

| EXAMPLE | STRUCTURE | THICKNESS (MILS) |
|---|---|---|
| 1 | IONOMER$_2$/LDPE$_1$/ADHESIVE$_1$/EVOH$_1$/ADHESIVE$_1$/LDPE$_1$/HDPE$_1$ | (6) |
| 2 | LDPE$_1$/EVA$_1$/ADHESIVE$_1$/EVOH$_1$/ADHESIVE$_1$/EVA$_1$/HDPE$_4$ | ( ) |
| 3 | IONOMER$_1$/EVA$_1$/ADHESIVE$_1$/EVOH$_1$/ADHESIVE$_1$/EVA$_1$/HDPE$_1$ | ( ) |
| 4 | IONOMER$_1$/EVA$_1$/ADHESIVE$_1$/EVOH$_1$/ADHESIVE$_1$/EVA$_1$/HDPE$_1$ | ( ) |
| 5 | IONOMER$_1$/EVA$_1$/ADHESIVE$_1$/EVOH$_1$/ADHESIVE$_1$/EVA$_1$/HDPE$_1$ | ( ) |
| 6 | IONOMER$_1$/EVA$_1$/ADHESIVE$_1$/EVOH$_1$/ADHESIVE$_1$/EVA$_1$/HDPE$_1$ | ( ) |
| 7 | IONOMER$_1$/EVA$_1$/ADHESIVE$_1$/EVOH$_1$/ADHESIVE$_1$/EVA$_1$/HDPE$_1$ | ( ) |
| 8 | IONOMER$_1$/EVA$_1$/ADHESIVE$_1$/EVOH$_1$/ADHESIVE$_1$/EVA$_1$/HDPE$_1$ | ( ) |
| 9 | IONOMER$_1$/EVA$_1$/ADHESIVE$_1$/EVOH$_1$/ADHESIVE$_1$/EVA$_1$/HDPE$_1$ | ( ) |
| 10 | IONOMER$_1$/EVA$_1$/ADHESIVE$_1$/EVOH$_1$/ADHESIVE$_1$/EVA$_1$/HDPE$_1$ | ( ) |
| 11 | IONOMER$_1$/EVA$_1$/ADHESIVE$_1$/EVOH$_1$/ADHESIVE$_1$/EVA$_1$/HDPE$_1$ | ( ) |
| 12 | IONOMER$_1$/EVA$_1$/ADHESIVE$_1$/EVOH$_1$/ADHESIVE$_1$/EVA$_1$/HDPE$_1$ | ( ) |
| 13 | IONOMER$_1$/EVA$_2$/ADHESIVE$_1$/EVOH$_1$/ADHESIVE$_1$/EVA$_2$/HDPE$_1$ | ( ) |
| 14 | IONOMER$_2$/LDPE$_1$/ADHESIVE$_1$/LDPE$_1$/ADHESIVE$_1$/LDPE$_1$/HDPE$_1$ | ( ) |
| 15 | IONOMER$_1$/EVA$_1$/EVA$_1$/LDPE$_1$/EVA$_1$/EVA$_1$/HDPE$_1$ | ( ) |
| 16 | IONOMER$_1$/EVA$_1$/EVA$_1$/LDPE$_1$/EVA$_1$/EVA$_1$/HDPE$_1$ | ( ) |
| 17 | IONOMER$_1$/EVA$_1$/EVA$_1$/LDPE$_1$/EVA$_1$/EVA$_1$/HDPE$_1$ | ( ) |
| 18 | IONOMER$_1$/EVA$_1$/EVA$_1$/LDPE$_1$/EVA$_1$/EVA$_1$/HDPE$_1$ | ( ) |
| 19 | IONOMER$_1$/EVA$_1$/ADHESIVE$_1$/EVOH$_1$/ADHESIVE$_1$/EVA$_2$/HDPE$_1$ | (4) |
| 20 | IONOMER$_2$/LDPE$_2$/ADHESIVE$_1$/EVOH$_1$/ADHESIVE$_1$/LDPE$_2$/HDPE$_3$ | (4) |
| 21 | EAO$_1$/EVA$_1$/ADHESIVE$_1$/EVOH$_1$/ADHESIVE$_1$/EVA$_2$/HDPE$_2$ | ( ) |
| 22 | EAO$_1$/EVA$_1$/ADHESIVE$_2$/EVOH$_2$/ADHESIVE$_2$/LDPE$_2$/HDPE$_2$ | ( ) |
| 23 | EAO$_1$/EVA$_1$/ADHESIVE$_3$/EVOH$_2$/ADHESIVE$_3$/LDPE$_2$/HDPE$_2$ | ( ) |
| 24 | EAO$_1$/EVA$_1$/ADHESIVE$_4$/EVOH$_2$/ADHESIVE$_4$ LDPE$_2$/HDPE$_2$ | ( ) |
| 25 | EAO$_1$/EVA$_1$/ADHESIVE$_4$/EVOH$_5$/ADHESIVE$_4$ LDPE$_2$/HDPE$_2$ | ( ) |
| 26 | EAO$_1$/EVA$_1$/ADHESIVE$_4$/EVOH$_3$/ADHESIVE$_4$ LDPE$_2$/HDPE$_2$ | ( ) |
| 27 | EAO$_1$/EVA$_1$/ADHESIVE$_4$/EVOH$_6$/ADHESIVE$_4$ LDPE$_2$/HDPE$_2$ | ( ) |
| 28 | EAO$_1$/EVA$_1$/ADHESIVE$_4$/EVOH$_1$/ADHESIVE$_4$ LDPE$_2$/HDPE$_2$ | ( ) |
| 29 | EAO$_1$/EVA$_1$/ADHESIVE$_4$/EVOH$_2$/ADHESIVE$_4$ LDPE$_2$/HDPE$_2$ | ( ) |
| 30 | IONOMER$_1$/LDPE/ADHESIVE$_1$/EVOH$_1$/ADHESIVE$_1$/LDPE$_1$/HDPE$_3$ | ( ) |
| 31 | IONOMER$_1$/EVA$_1$/ADHESIVE$_1$/EVOH$_1$/ADHESIVE$_1$/EVA$_2$/HDPE$_1$ | ( ) |
| 32 | EAO$_1$/EVA$_1$/ADHESIVE$_1$/EVOH$_1$/ADHESIVE$_1$/EVA$_2$/HDPE$_2$ | ( ) |
| 33 | EAO$_1$/EAV$_1$//ADHESIVE$_2$/EVOH$_1$/ADHESIVE$_2$/EVA$_1$/HDPE$_2$ | ( ) |
| 34 | EAO$_1$/EVA$_1$/ADHESIVE$_3$/EVOH$_1$/ADHESIVE$_3$/EVA$_1$/HDPE$_2$ | ( ) |
| 35 | EAO$_1$/EVA$_1$/ADHESIVE$_3$/EVOH$_2$/ADHESIVE$_3$/EVA$_1$/HDPE$_2$ | ( ) |
| 36 | EAO$_1$/EVA$_1$/ADHESIVE$_3$/EVOH$_3$/ADHESIVE$_3$/EVA$_1$/HDPE$_2$ | ( ) |
| **37 | EAO$_1$/EVA$_1$/ADHESIVE$_3$/EVOH$_4$/ADHESIVE$_3$/EVA$_1$/HDPE$_2$ | ( ) |
| 38 | EAO$_1$/EVA$_1$/ADHESIVE$_3$/EVOH$_1$/ADHESIVE$_3$/EVA$_1$/HDPE$_2$ | ( ) |
| 39 | EAO$_1$/EVA$_1$/ADHESIVE$_4$/EVOH$_1$/ADHESIVE$_4$/EVA$_1$/HDPE$_2$ | ( ) |

Examples 1 through 29 were tested on the devices depicted in FIG. 2, with the results given in Tables 1 through 3.

TABLE 1

Frequency of Film Ruptures as a Result of Hole Diameter and Film Type
(Blocks Packaged with Orifice on Top Surface)

| Example[1] | n | 1" | 3/4" | 5/8" | 1/2" | 3/8" | 5/16" | NBO[3] | Total Ruptures |
|---|---|---|---|---|---|---|---|---|---|
| 1 | 50 | — | 48 | 29 | 17 | 7 | 3 | — | 104 |
| | | | 16.0% | 9.7% | 5.7% | 2.3% | 1.0% | | 34.7% |
| 2 | 50 | — | 37 | 11 | — | — | — | 6 | 48 |
| | | | 12.3% | 3.7% | | | | | 16.0% |
| 3 | 50 | — | 47 | 20 | 3 | 1 | — | — | 71 |
| | | | 15.7% | 6.7% | 1.0% | 0.3% | | | 23.7% |
| 4 | 50 | — | 40 | 14 | 3 | — | — | 1 | 57 |
| | | | 13.3% | 4.7% | 1.0% | | | | 19.0% |
| 5 | 50 | — | 33 | 10 | 3 | — | — | 10 | 46 |
| | | | 11.0% | 3.3% | 1.0% | | | | 15.3% |
| 6 | 50 | — | 41 | 20 | 4 | — | — | 2 | 65 |

TABLE 1-continued

Frequency of Film Ruptures as a Result of Hole Diameter and Film Type
(Blocks Packaged with Orifice on Top Surface)

| Example[1] | n | _____ Hole Diameter[2] _____ | | | | | | NBO[3] | Total Ruptures |
|---|---|---|---|---|---|---|---|---|---|
| | | 1" | 3/4" | 5/8" | 1/2" | 3/8" | 5/16" | | |
| 7 | 50 | — | 13.7% 45 | 6.7% 15 | 1.3% 4 | — | — | 2 | 21.7% 64 |
| 8 | 50 | — | 15.0% 45 | 5.0% 13 | 1.3% 6 | — | — | 1 | 21.3% 64 |
| 9 | 50 | — | 15.0% 46 | 4.3% 15 | 2.0% — | — | — | — | 21.3% 61 |
| 10 | 50 | — | 15.3% 45 | 5.0% 19 | 5 | — | — | 1 | 20.3% 69 |
| 11 | 50 | — | 15.0% 45 | 5.0% 15 | 1.3% 4 | — | — | 1 | 21.3% 64 |
| 12 | 50 | — | 15.0% 44 | 5.0% 12 | 1.3% 3 | — | — | 1 | 21.3% 59 |
| 13 | 50 | — | 14.7% 39 | 4.0% 14 | 1.0% — | — | — | 6 | 19.7% 53 |
| | | | 13.0% | 4.7% | | | | | 17.7% |

[1]All materials 6-mil nominal thickness.
[2]All holes equal in depth (1").
[3]NBO = Number of no Blowouts resulting from n blocks packaged.

TABLE 2

Frequency of Film Ruptures as a Result of Hole Diameter and Film Type
(Blocks Packaged with Orifice on Top Surface)

| Example[1] | n | _____ Hole Diameter[2] _____ | | | | | | NBO[3] | Total Ruptures |
|---|---|---|---|---|---|---|---|---|---|
| | | 1" | 3/4" | 5/8" | 1/2" | 3/8" | 5/16" | | |
| 14 | 50 | 1 0.3% | 41 13.7% | 21 7.0% | 15 5.0% | 9 3.0% | 6 2.0% | — | 93 31.0% |
| 15 | 50 | — | 35 11.7% | 10 3.3% | 1 0.3% | — | — | 9 | 46 15.3% |
| 16 | 50 | — | 45 15.0% | 17 5.7% | 5 1.7% | 1 0.3% | — | — | 68 22.7% |
| 17 | 50 | — | 48 16.0% | 17 5.7% | 7 2.3% | — | — | — | 72 24.0% |
| 18 | 50 | — | 47 15.7% | 13 4.3% | 8 2.7% | 1 0.3% | — | 1 | 69 23.0% |

[1]Example 14 = 6-mil; Examples 15-18, = 4-mil (Non-Barrier Structures).
[2]All holes equal in depth (1").
[3]NBO = Number of No Blowouts resulting from n blocks packaged.

TABLE 3

Frequency of Film Ruptures as a Result of Hole Diameter and Film Type
(Blocks Packaged with Orifice on Top Surface)

| Example[1] | n | _____ Hole Diameter[2] _____ | | | | | | NBO[3] | Total Ruptures |
|---|---|---|---|---|---|---|---|---|---|
| | | 1" | 3/4" | 5/8" | 1/2" | 3/8" | 5/16" | | |
| 19 | 40 | 1 0.4% | 31 12.9% | 12 5.0% | 3 1.3% | — | — | 1 | 47 19.6% |
| 20 | 40 | — | 38 15.8% | 35 14.6% | 19 7.9% | 8 3.3% | 1 0.4% | — | 101 42.1% |
| 21 | 40 | 4 1.7% | 37 15.4% | 16 6.7% | 3 1.3% | — | — | — | 60 25.0% |
| 22 | 40 | — | 36 15.0% | 14 5.8% | 3 1.3% | — | — | — | 53 22.1% |
| 23 | 40 | 1 0.4% | 36 15.0% | 11 4.6% | 1 0.4% | — | — | — | 49 20.4% |
| 24 | 40 | 2 0.8% | 38 15.8% | 17 7.1% | 8 3.3% | 1 0.4% | — | — | 66 27.5% |
| 25 | 40 | 3 1.3% | 37 15.4% | 20 8.3% | 6 2.5% | 2 0.8% | — | — | 68 28.3% |
| 26 | 40 | 3 1.3% | 37 15.4% | 18 7.5% | 6 2.5% | 4 1.7% | — | — | 68 28.3% |
| 27 | 40 | 6 2.5% | 35 14.6% | 18 7.5% | 3 1.3% | — | — | — | 62 25.8% |
| 28 | 40 | 1 0.4% | 37 15.4% | 13 5.4% | 8 3.3% | 1 0.4% | — | — | 60 25.0% |
| 29 | 40 | 1 0.4% | 35 14.6% | 19 7.9% | 6 2.5% | 1 0.4% | — | — | 62 25.8% |

[1]All above materials 4-mil nominal thickness.
[2]All holes equal in depth (1 inch).
[3]NBO = Number of No Blowouts resulting from n blocks packaged.

It should be noted that the depth of the bores was constant, and that the film formed at about the same ratio (depth/diameter) at each bore. Thus, at the largest diameter bore (one inch) the film generally completed "coated" the bore, i.e. formed down to the bottom of the hole, and therefore did not suspend in the manner of the smaller sized bores.

In a modification of the test procedure, plastic blocks were used instead of wooden blocks. Ten cylindrical bores were drilled in the pattern shown in FIG. 3. In all other particulars, the test procedure was followed as outlined above. Results are tabulated in Table 4.

TABLE 4

Frequency of Film Ruptures as a Result of Hole Diameter and Film Type (Blocks Packaged with Orifice on Top Surface)

| Example | $n^1$ | 14 | 12 | 11 | 10 | 9 | 8 | 7 | 6 | 5 | 4 | Total Number Ruptures | $NBO^2$ |
|---|---|---|---|---|---|---|---|---|---|---|---|---|---|
| 30 | 40 | 40 | 40 | 40 | 39 | 22 | 13 | 5 | 2 | — | — | 201 | 0 |
| 31 | 40 | 28 | 9 | 4 | — | — | — | — | — | — | — | 41 | 10 |
| 32 | 40 | 40 | 30 | 19 | 4 | — | — | — | — | — | — | 93 | 0 |
| 33 | 40 | 39 | 14 | 7 | 2 | — | — | — | — | — | — | 62 | 1 |
| 34 | 40 | 40 | 15 | 12 | 4 | — | — | — | — | — | — | 71 | 0 |
| 35 | 40 | 7 | 3 | 2 | — | — | — | — | — | — | — | 12 | 29 |
| 36 | 40 | 11 | — | — | — | — | — | — | — | — | — | 11 | 29 |
| 37 | 40 | 17 | 4 | 4 | — | — | — | — | — | — | — | 25 | 20 |
| 38 | 40 | 19 | 4 | 2 | — | — | — | — | — | — | — | 25 | 20 |
| 39 | 40 | 33 | 13 | 1 | 1 | — | — | — | — | — | — | 48 | 4 |

$^1$n = Number of blocks packaged with each film, each block contained 10 holes with diameter listed above.
$^2$NBO = Number of blocks out of n which had no blow-outs.

These results show the superior implosion or rupture resistance of the materials in accordance with the invention.

Ten additional examples were evaluated for glossiness. In a first subjective test, fresh beef rib-eye steaks were packaged on a Cryovac ® VS-44 machine with each of the film examples except Example 40. The VS-44 machine was used to produce a pouch for vacuum packaging of the samples. Each package was held for 48 hours in the dark at 30° F. to 32° F. prior to evaluation. Packages of each film type were displayed in an open display case under cool white flourescent light for evaluation.

In the subjective gloss test, participants were asked to rank each of the 10 packages for gloss. Packages which ranked first were the most glossy and the packages ranked last were the least glossy. Numerical rankings for each example were averaged to yield a mean ranking score for gloss.

Improvements in gloss were attained by incorporation of XF-337K high density polyethylene on the outer surface compared with standard VSP webs currently used. Utilization of Dowlex 4002B ethylene alpha-olefin copolymer as a sealant improved package gloss compared to ionomer and linear low density polyethylene sealants.

Objective glossiness evaluations are listed in the last column of Table 5.

For purposes of identification, the examples have the following structures:

TABLE 5

| EXAMPLE | GLOSSINESS$^1$ (SUBJECTIVE) | GLOSSINESS (ASTM D2457) (45°) |
|---|---|---|
| 40 | 1.4 | — |
| 41 | 2.2 | 60. |
| 42 | 4.0 | 72. |
| 43 | 4.2 | 69. |
| 44 | 4.8 | 66. |
| 45 | 5.6 | — |
| 46 | 6.4 | 51. |
| 47 | 7.4 | 66. |
| 48 | 9.0 | 51. |
| 49 | 10.0 | 48. |

$^1$Ranking scale:
1 = most glossy
10 = least glossy
Average of five participants' rankings.

The above examples have been given by way of illustration only, and modifications within the purview of one skilled in the art are contemplated to be within the spirit and scope of the invention as claimed below.

What is claimed is:

1. An implosion resistant film comprising:
   (a) a core layer of ethylene vinyl acetate copolymer;
   (b) two intermediate layers each comprising ethylene vinyl acetate copolymer;
   (c) two polymeric layers of low density polyethylene which each bond an intermediate layer to a respective surface of the core layer;
   (d) a first outer layer bonded to one of the intermediate layers, comprising a heat sealable polymeric material; and
   (e) a second outer layer, bonded to one of the intermediate layers, comprising a high density polyethylene.

2. The film according to claim 1 wherein the first outer layer comprises an ionomer.

| EXAMPLE | STRUCTURE | THICKNESS (MILS) |
|---|---|---|
| 40 | IONOMER$_1$/ADHESIVE$_1$/NYLON$_1$/EVOH$_1$/NYLON$_1$/ADHESIVE$_1$/PP$_1$ | (6) |
| 41 | EAO$_1$/EVA$_1$/ADHESIVE$_1$/EVOH$_1$/ADHESIVE$_1$/EVA$_2$/HDPE$_2$ | (6) |
| 42 | HDPE$_2$/EVA$_1$/ADHESIVE$_1$/EVOH$_1$/ADHESIVE$_1$/EVA$_2$/EAO$_1$ | (6) |
| 43 | IONOMER$_1$/EVA$_1$/ADHESIVE$_1$/EVOH$_1$/ADHESIVE$_1$/EVA$_2$/HDPE$_2$ | (6) |
| 44 | EAO$_2$/EVA$_1$/ADHESIVE$_1$/EVOH$_1$/ADHESIVE$_1$/EVA$_2$/HDPE$_2$ | (6) |
| 45 | EAO$_2$/EVA$_1$/ADHESIVE$_1$/EVOH$_1$/ADHESIVE$_1$/EVA$_2$/HDPE$_2$ | (6) |
| 46 | IONOMER$_2$/LDPE$_2$/ADHESIVE$_1$/EVOH$_1$/ADHESIVE$_1$/LDPE$_2$/HDPE$_3$ | (6) |
| 47 | IONOMER$_1$/EVA$_1$/ADHESIVE$_1$/EVOH$_1$/ADHESIVE$_1$/EVA$_2$/HDPE$_2$ | (6) |
| 48 | IONOMER$_2$/LDPE$_1$/ADHESIVE$_1$/EVOH$_1$/ADHESIVE$_1$/LDPE$_1$/HDPE$_1$ | (6) |
| 49 | IONOMER$_1$/EVA$_1$/ADHESIVE$_1$/EVOH$_1$/ADHESIVE$_1$/EVA$_2$/HDPE$_1$ | (6) |

3. The film according to claim 1 wherein the first outer layer comprises an ethylene alpha-olefin copolymer.

4. The film according to claim 3 wherein the first outer layer comprises a linear low density polyethylene.

5. The film according to claim 3 wherein the first outer layer comprises a very low density polyethylene.

6. The film according to claim 1 wherein the film is cross-linked.

7. The film according to claim 1 wherein ethylene vinyl acetate copolymer comprises between about 63% and 67% of the total film thickness.

8. A vacuum skin package made with the film of claim 1.

* * * * *